United States Patent
Hyde et al.

(10) Patent No.: US 8,254,869 B2
(45) Date of Patent: Aug. 28, 2012

(54) SMART ANTENNA MODULE

(75) Inventors: Stephen L. Hyde, Clarkston, MI (US); Nikolai Alexandrov, Thornhill (CA); Basim Alkhateeb, Irbid (JO)

(73) Assignee: Chrysler Group LLC, Auburn Hills, MI (US)

( * ) Notice: Subject to any disclaimer, the term of this patent is extended or adjusted under 35 U.S.C. 154(b) by 286 days.

(21) Appl. No.: 12/705,669

(22) Filed: Feb. 15, 2010

(65) Prior Publication Data

US 2010/0210234 A1 Aug. 19, 2010

Related U.S. Application Data

(60) Provisional application No. 61/153,687, filed on Feb. 19, 2009.

(51) Int. Cl.
*H05K 11/02* (2006.01)
*H04K 3/00* (2006.01)
(52) U.S. Cl. .............................. 455/345; 701/2; 701/29
(58) Field of Classification Search .................. 455/345, 455/352–354, 418–420; 701/2, 29, 36
See application file for complete search history.

(56) References Cited

U.S. PATENT DOCUMENTS

| | | | |
|---|---|---|---|
| 4,039,953 A * | 8/1977 | Chadwick | 455/135 |
| 6,417,766 B1 | 7/2002 | Starkey | |
| 6,518,876 B1 | 2/2003 | Marguet et al. | |
| 6,580,365 B2 | 6/2003 | Starkey | |
| 6,710,708 B2 | 3/2004 | McClelland et al. | |
| 6,809,639 B2 | 10/2004 | Marguet et al. | |
| 6,882,270 B2 | 4/2005 | Stewart et al. | |
| 6,906,624 B2 | 6/2005 | McClelland et al. | |
| 7,079,903 B2 | 7/2006 | O'Brien | |
| 7,088,226 B2 | 8/2006 | McClelland et al. | |
| 7,362,218 B2 | 4/2008 | McCall et al. | |
| 7,367,227 B2 | 5/2008 | Stewart et al. | |
| 7,423,532 B2 | 9/2008 | Stewart et al. | |
| 2005/0123071 A1* | 6/2005 | Okada et al. | 375/316 |
| 2006/0170610 A1 | 8/2006 | Rabinovich et al. | |
| 2008/0020723 A1 | 1/2008 | Rabinovich et al. | |

* cited by examiner

*Primary Examiner* — Lee Nguyen
(74) *Attorney, Agent, or Firm* — Ralph E. Smith

(57) ABSTRACT

A communication system is provided and may include a receiver that receives an analog signal, a processor in communication with the receiver that converts the analog signal to a digital signal, a control unit that receives the digital signal and communicates an executable command to a vehicle system, and a communication medium in communication with the processor and the control unit and facilitates communication of the digital signal therebetween. The receiver and the processor may be integrated into an antenna module.

20 Claims, 4 Drawing Sheets

SMART ANTENNA MODULE

CROSS-REFERENCE TO RELATED APPLICATIONS

This application claims the benefit of U.S. Provisional Patent Application Ser. No. 61/153,687 filed Feb. 19, 2009.

FIELD

The present disclosure relates to a communication system, and more particularly to a communication system for a vehicle having an antenna module.

BACKGROUND

Modern vehicles often include systems employing remote actuation or communication means. Such systems may include remote keyless entry systems, tire pressure monitoring systems, remote engine starter systems, alarm systems, or vehicle diagnostic systems, for example. An operator may actuate or communicate with these systems with a radio frequency transmitter such as a key fob or RFID (radio frequency identification) device, for example, or any other device that broadcasts radio frequency signals.

Analog radio frequency signals are susceptible to electromagnetic interference. Accordingly, coax cable is often employed to transmit radio frequency signals from an antenna to a controller to shield the signal from interference. Coax cable must often be routed separately from standard vehicle wiring and therefore increases manufacturing cost and complexity.

SUMMARY

A communication system is provided and may include a receiver that receives an analog signal, a processor in communication with the receiver that converts the analog signal to a digital signal, a control unit that receives the digital signal and communicates an executable command to a vehicle system, and a communication medium in communication with the processor and the control unit and facilitates communication of the digital signal therebetween. The receiver and the processor may be integrated into an antenna module.

A radio frequency reception system for a vehicle may include an antenna module, an electronic control unit, and a communication medium associated with the antenna module and the electronic control unit that provides electrical communication therebetween. The antenna module may include a receiver that receives a radio frequency signal and the processor may convert the radio frequency signal to a digital signal. The electronic control unit may be disposed in an instrument panel of the vehicle and the electronic control unit may receive the digital signal via the communication medium and may generate a command signal based on the digital signal to actuate a vehicle subsystem.

A method may include receiving a wireless analog signal in an antenna module, converting the analog signal to a digital signal in the antenna module, receiving the digital signal in a control unit, and generating a command signal based on the digital signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

DETAILED DESCRIPTION

Figure 1:
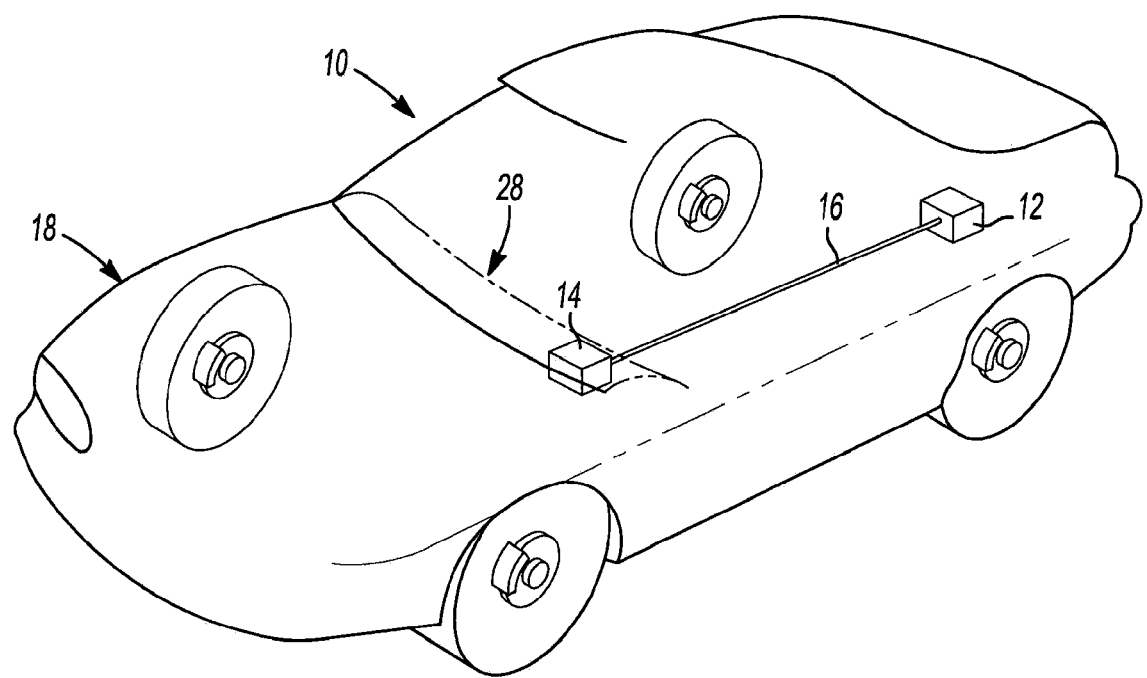
FIG. 1 is a schematic representation of a vehicle having a communication system according to the principles of the present disclosure.
Figure 2:
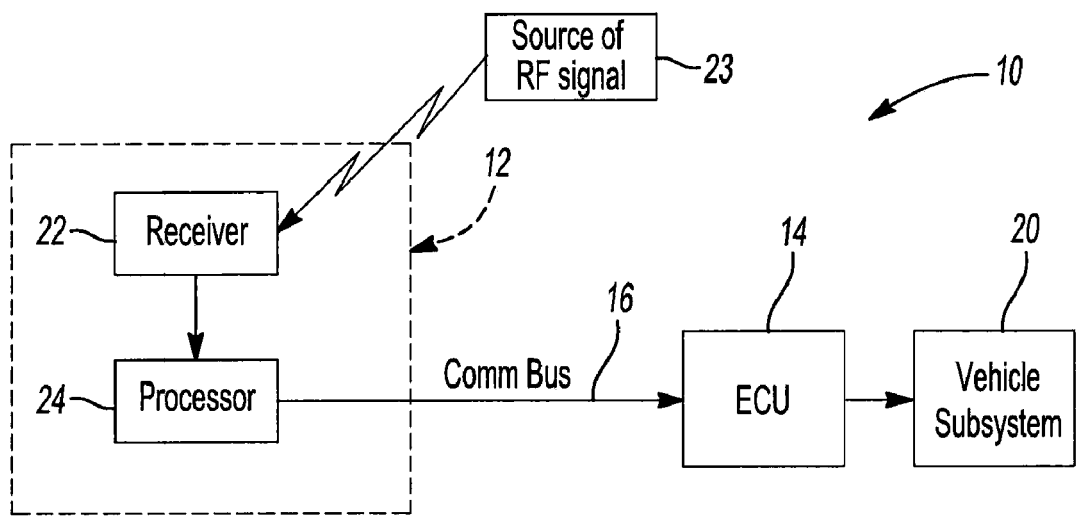
FIG. 2 is a block diagram of the communication system of FIG. 1.

The following description of the preferred embodiments is merely exemplary in nature and is in no way intended to limit the invention, its application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent,"

etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIGS. 1-5, a communication system 10 is provided and may include an antenna module 12, an electronic control unit (ECU) 14, and a communication bus 16. The communication system 10 may be installed in a vehicle 18, as shown in FIG. 1. The antenna module 12 may receive a radio frequency (RF) signal, digitize the signal, and communicate the digital signal to the ECU 14 via the communication bus 16 or any other communication medium. The ECU 14 may generate a command signal based on the digital signal received from the antenna module 12 and may communicate the command signal to a vehicle subsystem 20.

The antenna module 12 may include an integrated receiver 22 and processor 24. Integrating the receiver 22 and the processor 24 into a single unit (i.e., the antenna module 12) may reduce cost and complexity of manufacturing the vehicle 18 and may be more readily packaged into the vehicle 18. Although FIG. 1 depicts the antenna module 12 being disposed in the rear portion of the vehicle 18, the antenna module 12 could be disposed in any other location of the vehicle 18. The antenna module 12 may be located within the vehicle 18 according to packaging, reception, and/or other constraints and/or requirements.

The receiver 22 may receive analog radio frequency signals from an RF source 23 such as a remote keyless entry fob, a tire pressure monitoring system, or other RFID devices, for example, or any other device that broadcasts a radio frequency signal. The receiver 22 could be an antenna arm such as a monopole, meander line, simple loop, fractal tree, or other antenna structure. The antenna module 12 could include a plurality of receivers 22 forming a diversity antenna, which may be of the type disclosed in U.S. Patent Application Publication Nos. 2006/0170610 and 2008/0020723, the disclosures of which are hereby incorporated by reference.

The plurality of receivers 22 could be disposed on the same or different circuit boards, may have different gains, and could be in communication with a switching circuit 26. The switching circuit 26 may be any type of real electrical switch and may select an optimal signal among the plurality of receivers 22 based on the greatest signal-to-noise ratio and may then allow the optimal signal to be communicated to the ECU 14.

Figure 5:
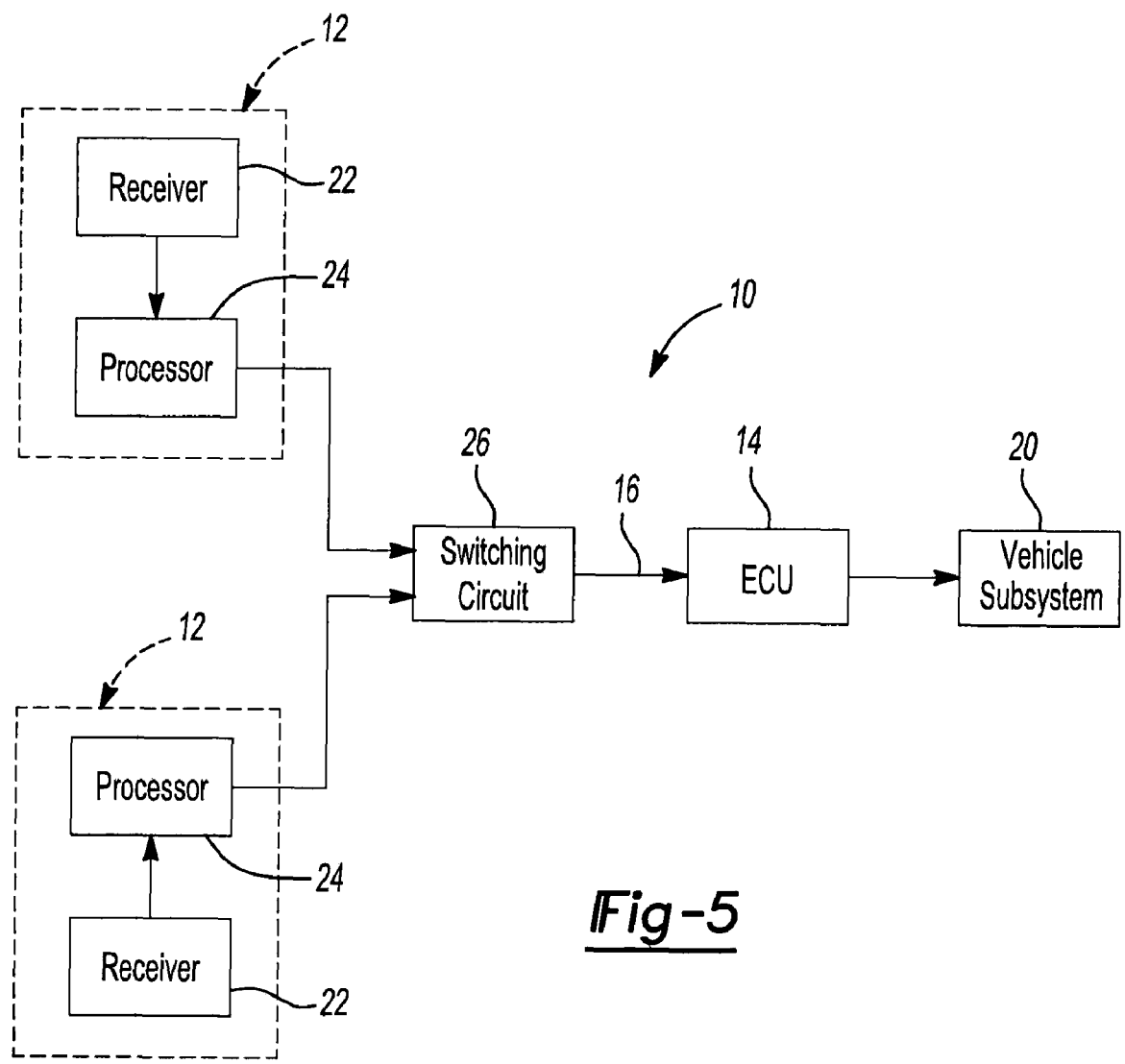
FIG. 5 is a block diagram of another embodiment of the communication system according to the principles of the present disclosure.

Additionally or alternatively, the communication system 10 could include a plurality of antenna modules 12 (FIG. 5). Each of the plurality of antenna modules 12 could be disposed in different locations of the vehicle 18, such as the front, middle, and/or back of the vehicle 18, for example. Each of the plurality of antenna modules 12 may include one or more receivers 22 and a processor 24. Each of the plurality of receivers 22 may be in communication with the switching circuit 26, which may be a real electrical switch or a logical switch and may selectively allow communication between one of the receivers 22 and the processor 24 or the ECU 14. The switching circuit 26 could include a port or router in the communication bus 16.

As described above, the receiver 22 and the processor 24 may be integrated into the antenna module 12. The processor 24 may be in communication with the receiver 22 and may include a linear or non-linear analog-to-digital converter (ADC) that converts the analog RF signal received by the receiver 22 into a digital signal. Digitization of the RF signal could be accomplished via sampling, binary filtering, or data processing, for example, or by any other analog-to-digital conversion method.

The processor 24 may be in communication with the ECU 14 via the communication bus 16. The communication bus 16 may include standard non-coaxial vehicle wiring such as a local interconnect network (LIN), a controller area network (CAN), or J1850 network, for example, or any other local network or communication medium. The standard wiring of the communication bus 16 allows the antenna module 12 and the ECU 14 to be located in separate areas of the vehicle 18. Since the antenna module 12 and ECU 14 are coupled via standard vehicle wiring, and not via a dedicated coax cable, the antenna module 12 may be positioned at an optimum location in the vehicle 18 for the antenna module 12 irrespective of the position of the ECU 14. Furthermore, by eliminating use of a dedicated coax cable that would otherwise be employed to transmit an RF signal from the receiver 22 to the ECU 14, and relying instead on existing vehicle wiring, the overall cost and complexity of the vehicle 18 is reduced.

For example, as shown in FIG. 1, the ECU 14 may be disposed in an instrument panel 28 of the vehicle 18, proximate other vehicle electronics. The antenna module 12 may be remotely located relative to the ECU 14, for example, in the front or rear portion of the vehicle 18 or otherwise spaced apart from sources of electromagnetic interference that may hinder reception of the RF signal. Analog signals may be susceptible to electromagnetic interference, while digital signals are not. Accordingly, the antenna module 12 may be spaced apart from the ECU 14 to receive the analog RF signal, convert the analog signal to a digital signal in the antenna module 12, and transmit the digital signal to the ECU 14 via the standard wiring of the communication bus 16. Accordingly, the communication system 10 disclosed herein does not need to employ coax cable to transmit information from the antenna module 12 to the ECU 14, thereby reducing manufacturing cost and complexity.

The ECU 14 may be a control module disposed in, on, or proximate to the instrument panel 28 (FIG. 1) of the vehicle 18, for example, or any other portion of the vehicle 18. As used herein, the term "electronic control module" or "ECU" may refer to, be part of, or include an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality. The ECU 14 may receive the digital signal from the processor 24 via the communication bus 16, and may generate an executable command based on information provided by the digital signal. The executable command may be communicated to the vehicle subsystem 20, which may include a power door lock system, a tire pressure monitoring system, a remote engine starter system, an alarm system, a remote diagnostic system, or any other electrically actuated system of the vehicle 18.

Figure 3:
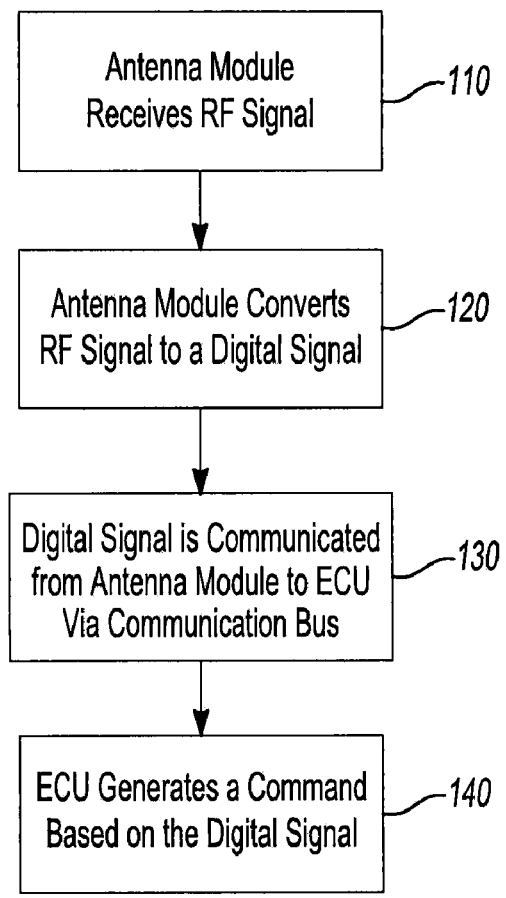
FIG. 3 is a flowchart illustrating operation of the communication system of FIG. 1.
Figure 4:
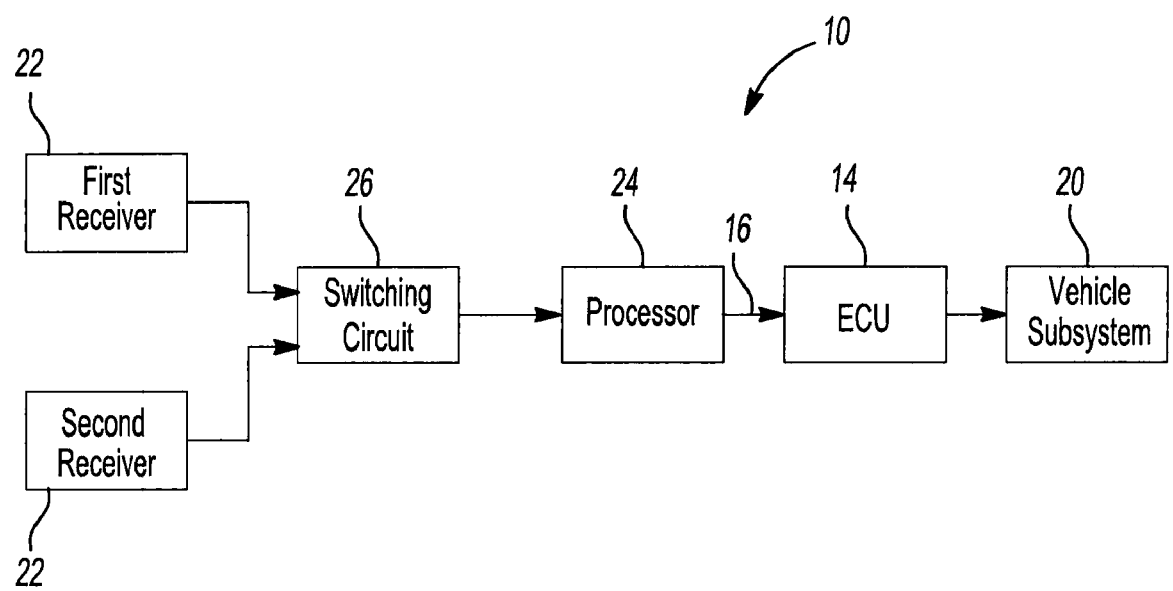
FIG. 4 is a block diagram of a communication system including a plurality of receivers according to the principles of the present disclosure.

For example, the RF source 23 which, as described above, could be a key fob for a remote keyless entry system, may broadcast an analog RF signal in the proximity of the vehicle 18. As shown in FIG. 3, the antenna module 12 may receive the RF signal in the receiver 22 at step 110. The receiver 22 may communicate the RF signal to the processor 24, where the analog signal may be converted to a digital signal at step 120, as described above. The digital signal may then be transmitted from the antenna module to the ECU 14 via the communication bus 16 at step 130. Based on the information provided by the digital signal, the ECU 14 may generate a command signal at step 140 and communicate the command signal to the vehicle subsystem 20 which, as described above, could be a power door lock system. The command signal may allow the power door lock system to lock or unlock one or more doors of the vehicle 18, for example.

It should be appreciated that the communication system 10 could include an additional receiver that receives an RF signal and communicates an analog signal to the ECU 14 via a coaxial cable. Such an embodiment may provide additional wide bands and channels and improve gain and performance. The additional receiver could be integrated into the ECU 14 or the additional receiver could be external to the ECU 14 and located in or proximate to the instrument panel 28, for example. To limit manufacturing complexity, a manufacturer may choose to provide the ECU 14 with an integrated receiver on all vehicles and only add an external receiver and/or the antenna module 12 on vehicles having a long range communication feature, such as remote start feature, for example.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system comprising:
    a receiver adapted to receive an analog signal;
    a processor in communication with said receiver and operable to convert said analog signal to a digital signal;
    a control unit adapted to receive said digital signal and communicate an executable command to a vehicle system; and
    a communication medium communicating said digital signal between said processor and said control unit,
    wherein said receiver and said processor are integrated into an antenna module.

2. The system of claim 1, wherein said communication medium is a local interconnect network.

3. The system of claim 1, wherein said analog signal is a radio frequency signal.

4. The system of claim 1, wherein said antenna module includes a plurality of receivers adapted to receive said analog signal.

5. The system of claim 4, further comprising a switching circuit adapted to select an optimal signal among said plurality of receivers based on a signal to noise ratio of said analog signal received by each of said plurality of receivers and which has a greatest signal to noise ratio and allow the optimal signal to be communicated to said processor.

6. The system of claim 1, further comprising a plurality of antenna modules in communication with said control unit and each having a receiver adapted to receive said analog signal.

7. The system of claim 6, further comprising a switching circuit adapted to select an optimal signal among the receivers of said plurality of antenna modules based on which said analog signal received by each of the receivers has a greatest signal to noise ratio and allow the optimal signal to be communicated to said processor.

8. The system of claim 1, wherein said antenna module is disposed remotely from said control unit.

9. A method comprising:
    receiving a wireless analog signal in an antenna module;
    converting said analog signal to a digital signal in said antenna module;
    receiving said digital signal in a control unit; and
    generating a command signal based on said digital signal.

10. The method of claim 9, wherein said digital signal is communicated from said antenna module to said control unit via a communication medium.

11. The method of claim 9, wherein said antenna module includes a receiver and a processor.

12. The method of claim 9, wherein said wireless analog signal is a radio frequency signal.

13. The method of claim 9, wherein said antenna module is spaced apart from said control unit.

14. The method of claim 9, further comprising receiving a second wireless analog signal in a second antenna module.

15. The method of claim 14, further comprising selecting an optimal signal among the first and second analog signals based on which has a greatest signal to noise ratio and allowing communication of the optimal signal to the control unit.

16. The method of claim 9, further comprising communicating said command signal to a vehicle subsystem.

17. A radio frequency reception system for a vehicle comprising:
    an antenna module having a receiver adapted to receive a radio frequency signal and a processor adapted to convert said radio frequency signal to a digital signal;
    an electronic control unit disposed in an instrument panel of the vehicle; and
    a communication medium associated with said antenna module and said electronic control unit and providing electrical communication therebetween,
    wherein said electronic control unit receives said digital signal via said communication medium and generates a command signal based on said digital signal to actuate a vehicle subsystem.

18. The radio frequency reception system of claim 17, wherein said communication medium is a local interconnect network.

19. The radio frequency reception system of claim 18, wherein said antenna module is spaced apart from said instrument panel.

20. The radio frequency reception system of claim 18, further comprising a second receiver adapted to receive said radio frequency signal.

\* \* \* \* \*